(12) United States Patent  
Fister et al.

(10) Patent No.: US 8,794,133 B2  
(45) Date of Patent: Aug. 5, 2014

(54) GRATING DISC FOR A FOOD PROCESSOR

(75) Inventors: Ines Fister, Ferlach (AT); Thomas Johannes Gaertner, Villach (AT); Heimo Obersteiner, Klagenfurt (AT); Claudio Brenna, Klagenfurt (AT)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/509,884

(22) PCT Filed: Dec. 10, 2010

(86) PCT No.: PCT/IB2010/055740
§ 371 (c)(1),
(2), (4) Date: May 15, 2012

(87) PCT Pub. No.: WO2011/073873
PCT Pub. Date: Jun. 23, 2011

(65) Prior Publication Data
US 2013/0068116 A1    Mar. 21, 2013

(30) Foreign Application Priority Data

Dec. 17, 2009   (EP) ..................................... 09179556

(51) Int. Cl.
*A23N 1/02*      (2006.01)
*A47J 43/25*     (2006.01)

(52) U.S. Cl.
USPC ............... 99/503; 99/511; 99/513; 241/273.2

(58) Field of Classification Search
USPC .......................... 99/503, 511, 513; 241/273.2
See application file for complete search history.

(56) References Cited

U.S. PATENT DOCUMENTS

| | | | | |
|---|---|---|---|---|
| 2,409,497 A | * | 10/1946 | Kessel | 99/511 |
| 2,528,381 A | * | 10/1950 | Mantelet | 241/273.2 |
| 3,985,304 A | | 10/1976 | Sontheimer | |
| 4,277,995 A | * | 7/1981 | Sontheimer | 83/150 |
| 5,613,430 A | * | 3/1997 | Lee | 99/510 |
| 7,226,012 B2 | | 6/2007 | Pai | |
| 2005/0235839 A1 | | 10/2005 | Lin | |
| 2008/0202355 A1 | | 8/2008 | Krall et al. | |

FOREIGN PATENT DOCUMENTS

| | | |
|---|---|---|
| GB | 538566 A | 8/1941 |
| JP | 2005334011 A | 12/2005 |

* cited by examiner

*Primary Examiner* — Jianying Atkisson

(57) ABSTRACT

A grating disc (4) arranged to be rotatably mounted within a food processor (1), to rotate in a direction of rotation (26), which grating disc (4) comprises at least one grating tooth (24) for grating food to be processed. The grating disc (4) comprises at least one groove (28) extending from an inner region (21) to an outer edge (22) of the grating disc (4) to assist in guiding food particles outwardly during use of the food processor (1). With the provision of a grating disc in accordance with the present invention, improved output of processed food is accomplished in that the at least one groove with assistance of centrifugal force guides the processed food outwardly for retrieval.

15 Claims, 2 Drawing Sheets

GRATING DISC FOR A FOOD PROCESSOR

FIELD OF THE INVENTION

The present invention relates to a grating disc arranged to be rotatably mounted within a food processor.

BACKGROUND OF THE INVENTION

In order to facilitate and/or refine preparation of food, one may choose the assistance of a food processor. A food processor may be utilized for a variety of processing operations, for instance to prepare food by juicing, squeezing, mixing, cutting, grinding, chopping, slicing, grating, milling or shredding. Different ranges of use and varying sizes of food articles to be processed have resulted in a variety of food processors being available on the market, in various sizes and forms. The food processor may be multifunctional or optimized for one or more special tasks so as to operate, for example, as a centrifugal juicer for extracting juice.

In most cases, the food processor is electrical, having an inlet piece to feed the food to be processed downwardly onto a rotating element such as a grating disc or the like driven by a motor accommodated in the housing of the food processor. Furthermore, in order to grate food or extract juice, the rotating disc is typically provided with grating teeth. Juice extractors using a grating disc may extract juice from for instance a fruit or a vegetable by pressing it onto the grating disc, which grates material from the surface of the fruit or vegetable while at the same time releasing the juice. The grated material and the juice are typically thrown upwardly and outwardly by centrifugal forces against the surface of a filter surrounding the grating disc. The pulp carries on over the edge of the filter and is collected in a suitable receptacle while the finely filtered juice passes through the filter into another receptacle. The juice is thereby ready to be served.

The juice yield of current food processors is however commonly not satisfying, as the grating discs utilized in these juice extractors typically are not fully elaborated to get the highest possible juice output. Accordingly, in order to improve the efficiency of food processors, attempts have been made to introduce grating disc design refinements. WO 2006/087674, for instance, suggests interstitial cutting teeth arranged in an interstice formed by an inlet piece and a grating disc. Thereby, pieces of fruit or vegetables may be additionally crushed and comminuted between the interstitial cutting teeth and the inner opening of the inlet. Although the juice contained in these pieces of fruit or vegetables is thus more efficiently extracted, the suggested solution however implies the need for extra teeth—i.e. the additional interstitial teeth.

Accordingly, there is still a need for an alternative grating disc elaborated for improved yield of processed food such as juice, and/or for facilitated cleanability after use, according to which the above-related drawbacks are at least partly eliminated.

SUMMARY OF THE INVENTION

According to the invention, the above need is at least partly met by a grating disc arranged to be rotatably mounted within a food processor, to rotate in a direction of rotation, which grating disc comprises at least one grating tooth for grating food to be processed. The grating disc comprises at least one groove extending from an inner region to an outer edge of the grating disc to assist in guiding food particles outwardly during use of the food processor.

With a grating disc in accordance with the present invention, improved output of processed food is accordingly accomplished in that the at least one groove with assistance of centrifugal force guides the processed food outwardly for retrieval. Less food particles hence remain on the grating disc, whereby a higher yield of retrieved processed food is attained, i.e. a higher quantity of food particles may be extracted. Furthermore, less food particles remaining on the grating disc may imply improved cleanability of the grating disc after use. The user may merely need to rinse the grating disc to remove caught food particles rather than applying a brush or his fingers for thorough cleaning. With the avoidance of cleaning the grating disc with ones fingers, unhygienic and/or dangerous touching may additionally be avoided.

Also, those grating teeth located immediately behind a groove will have a greater effective height above the disc surface, as the disc surface in front of these teeth is defined by the bottom of the grove.

The grating disc according to the invention is intended to be used within a food processor for processing of food. The grating disc is preferably mounted to rotate horizontally within the food processor, and/or in a plane perpendicular to a feeding direction of the food to be processed, but may, if appropriate for the implementation at hand, be rotatably mounted in any feasible plane. The food processor is for instance a centrifugal juicer, the food to be processed for instance a piece of fruit or vegetable to be grated, and the resulting processed food accordingly for instance juice and pulp. For grating of the food, the grating disc comprises at least one grating tooth, i.e. cutting tooth, which may be of any shape feasible for grating, and which may be well known in the art. Out of convenience as well as for optimized functionality, the grating disc may have an essentially flat disc surface from which the at least one grating tooth protrudes. In order to separate the pulp from the juice, the grating disc may in a manner known in the art be surrounded by a filter such as a sieve of frustoconical shape, whereby during use of the food processor—i.e. during rotation of the grating disc and as a result of centrifugal forces—the pulp may be carried over the edge of the filter while the finely filtered juice may pass there through. Other alternatives for separating the pulp from the juice are likewise possible.

With the introduction of at least one groove extending from an inner region to an outer edge of the grating disc, there is presented the ability of improved transport of the e.g. juice and pulp outwardly towards e.g. the sieve as the centrifugal forces act on the fruit particles. The inner region is preferably a centered portion of the grating disc, but "inner region" is intended to likewise cover a portion of the grating disc having a slight offset from the grating disc center. The groove may take on any feasible curvature appropriate for guiding food particles outwardly towards an outer edge of the grating disc, and may furthermore be of any appropriate length. The groove may be a hollow extension in the disc surface, in which the food particles may be guided outwardly during rotation of the grating disc. The groove may have a depth typically in the order of a few mm, and as an example it may be around 2 mm deep. The extension of the groove may take on any cross section considered appropriate, such as for instance a cross section being U-shaped, V-shaped, or rectangular; the shape may even vary along the extension should that be preferred. For avoidance of a user potentially injuring himself from cleaning the grating disc with his fingers after use of the food processor, edges of the groove are preferably smooth. Moreover, the groove may be provided on the grating disc by any appropriate means, for instance by griding, molding, or pressing. By arranging the groove to extend to the outer edge of the grating disc the food particles are allowed to easily be carried over the grating disc edge to the e.g. surrounding sieve. Accordingly, during use of the food processor and hence with a high rotation velocity of the grating disc, the groove accordingly makes it possible for the food particles to be transported outwardly better and faster as compared to a grating disc known in the art lacking such a groove.

As previously mentioned, the groove may take on any curvature considered appropriate for guiding food particles outwardly. According to one embodiment, however, the at least one groove is curved to form a bulge in the direction of rotation. In other words, the leading side of the curved groove is convex. The convex shape provides for the ability to reach maximum acceleration of the processed food, hence resulting in optimized flow outwardly of the e.g. pulp and juice. According to an alternative embodiment, the at least one groove is essentially straight. The essentially straight disposition of the groove provides for a convenient solution and simple design. "Essentially straight" is here intended to include as well "close to" straight and "almost" straight, thus including minor deviations from a straight extension. Regardless of the groove being straight or curved in a convex manner, the groove is adapted to assist in guiding food particles outwardly from the inner region to the outer edge of the grating disc with rotation of the grating disc.

To further improve the efficiency of retrievable processed food, the groove and the grating tooth may furthermore be arranged in an optimized manner in relation to each other. Consequently, according to one embodiment, the at least one grating tooth has a grating face intended to intersect with the food during use of the food processor, which at least one groove is arranged alongside the grating face. With the groove being arranged alongside the grating face, improved cutting properties may be accomplished in that an increased height of the grating face may be provided. Furthermore, since the groove transports the processed food outwardly, the disc area in front of the grating face may be kept clean from food particles, which accordingly allows the grating tooth to provide optimized functionality. By "grating face" is here intended a section of the grating tooth assisting in grating of the food, i.e. a surface of the grating tooth considered a front surface in the direction of rotation of the grating disc, which front surface projects from the grating disc towards a top surface of the grating tooth. Notably, "alongside" is here intended to include as well "essentially" alongside and "close to" alongside. Accordingly, a groove may for instance be arranged a slight distance from the grating face, or for instance, a first portion of a curved groove may be arranged closer to a first portion of the grating face than a second portion of the groove radiating away from a second portion of the grating face.

The grating disc may comprise a plurality of grating teeth, which may be randomly arranged over the surface of the disc. However, the teeth may also be arranged in at least one line extending from the inner region toward the outer edge, where the at least one groove extends at least partly along the at least one line. In this case, al teeth in the line will have a larger effective height as described above. Notably, the line need not necessarily be a straight line, but may likewise take on any feasible form such as for instance being curved. By arranging the groove to extend along the line of grating teeth, all grating teeth concerned along which the groove stretches may take advantage of the benefits there from such as for instance the improved centrifugal motion of processed food. It should be emphasized that "along" here is intended to include as well "essentially" along and "close to" along. Accordingly, a groove may for instance be arranged to extend along the line at a slight distance there from. Furthermore, a first portion of a groove may for instance be arranged closer to a first section of the line than a second portion of the groove to a second section of the line.

According to a further alternative embodiment, the at least one groove extends alongside the grating faces of the line of grating teeth. Thereby, the cutting properties of all concerned grating teeth of the line along which the groove stretches may be improved in that the area of the grating disc in front of the grating faces, i.e. in front of the front sections of the grating teeth intersecting with the food during rotation of the grating disc, may be kept clean from food particles.

The grating disc may generally comprise any number of lines and any number of grooves arranged in any feasible and preferred manner on the grating disc. In order to even further improve the food processing efficiency, however, according to one embodiment; the grating disc comprises a plurality of lines and a plurality of grooves, wherein for at least one line and two adjacent grooves, the one line is disposed in between the two adjacent grooves. Thereby, with this suggested intertwined disposition of the line(s) and grooves, the improved functionality offered by the grooves in guiding the processed food outwardly for retrieval may be utilized for the at least one line, and preferably for all of the lines. Notably, the lines may comprise different numbers of grating teeth and be arbitrarily distributed across the grating disc. However, by choosing the plurality of lines to be uniformly distributed, the disc surface of the grating disc may be optimally utilized.

Additionally, the invention relates to a food processor, particularly for extracting juice, comprising a grating disc in accordance with the above. With such food processor, similar effects as described in the foregoing throughout this chapter may be accomplished. According to one embodiment, the food processor is a centrifugal juicer.

It is noted that the invention relates to all possible combinations of features recited in the claims.

It is noted that patent document GB 538,566 discloses a grating disc having toothed blades, scraper blades and grooves having sharp edges to assist in the grating of the food. The grooves disclosed by GB 538,566 are shaped such that the bottom of these grooves in inclined outwardly toward the periphery of the grating disc so that loose particles engaging in the grooves are thrown outwardly toward the periphery upon the rapid rotation of the disc. GB 538,566 discloses said grooves to terminate at some distance from the periphery of the disc. GB 538,566 discloses said grooves to be placed in groups of multiple grooves wherein said grooves run parallel.

BRIEF DESCRIPTION OF THE DRAWINGS

This and other aspects of the present invention will now be described in more detail, with reference to the appended drawings showing embodiment(s) of the invention. Like reference characters refer to like elements throughout.

DETAILED DESCRIPTION

Figure 1:
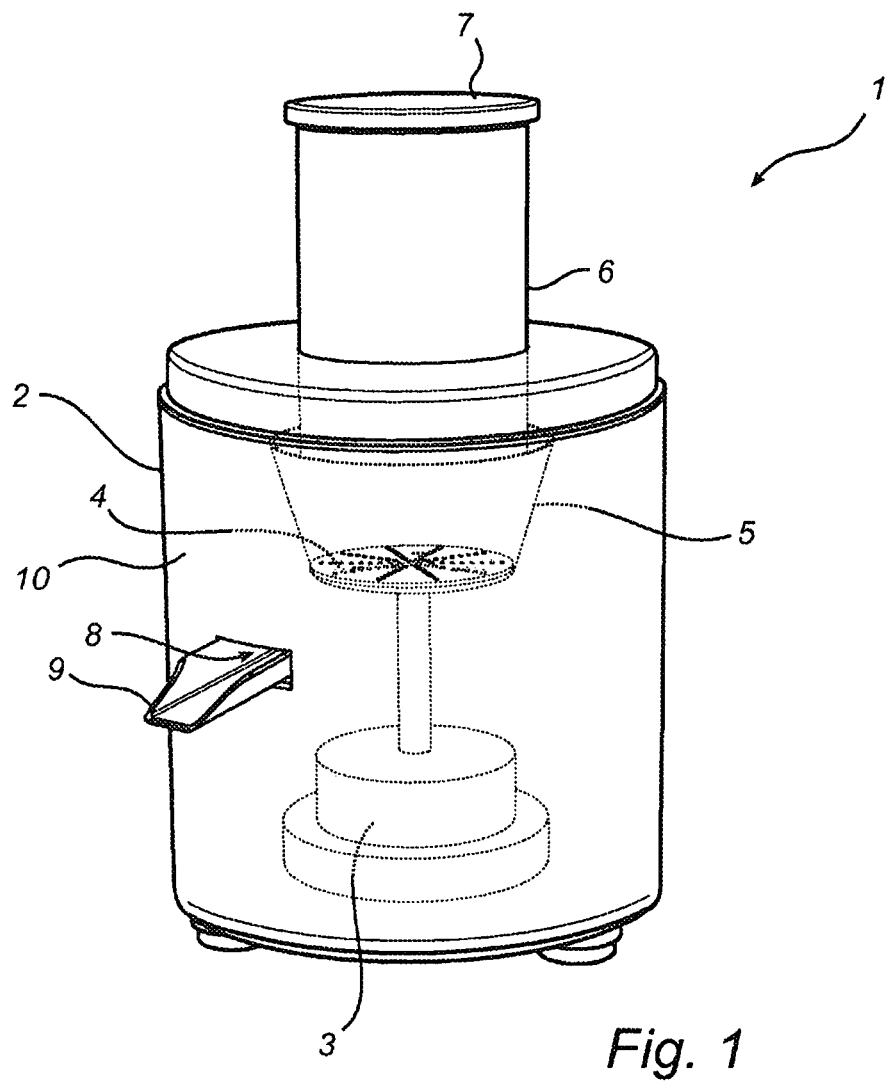
FIG. 1 presents an exemplifying food processor in accordance with a first embodiment of the present invention.

FIG. 1 presents an exemplifying food processor 1 in accordance with a first embodiment of the present invention. The food processor 1 is here a centrifugal juicer, but according to alternative embodiments, other food processors are likewise within the scope. Accordingly, although the centrifugal juicer 1 here is adapted for extracting juice from pieces of fruit or vegetables, alternative food processors may hence be adapted for processing of any other feasible food.

The centrifugal juicer 1 of FIG. 1 comprises an inlet piece 6 for introducing the e.g. piece of fruit into the centrifugal juicer 1. In order to manually push the piece of fruit downwardly, the centrifugal juicer 1 may furthermore comprise a pusher 7. Notably, the shape and dimensions of the inlet piece 6 and/or pusher 7 may be selected with the implementation at hand in mind, and the design is not crucial to the invention. The centrifugal juicer 1 furthermore comprises a housing 2, which accommodates an electrical motor 3 with a driving shaft for driving a grating disc 4 rotatably mounted on the driving shaft to a rotational movement. Here, a direction of rotation of the grating disc 4 takes place in a horizontal plane perpendicular to a feeding direction of the inlet piece 6, although other directions may be chosen for alternative embodiments. The grating disc 4 is arranged in the middle of a frustoconical filter sieve 5 adapted to separate the juice from the pulp and to direct the juice to an outlet tube 8. The outlet tube 8 is overlying a spout 9 arranged for outletting the extracted juice into a receptacle (not shown) to be placed there under. Additionally, a pulp receptacle 10 is provided to receive the pulp in the sieve 5 after extraction of the juice there from. Notably, any other feasible alternative positioning of the grating disc 4 within the sieve 5 is likewise within the scope, as well as filters 5 of other shapes.

The centrifugal juicer 1 is arranged such that upon rotation of the grating disc 4, the piece of fruit may be grated by the grating disc 4, whereby juice and pulp are thrown against the filter sieve 5. The juice may accordingly drip through the sieve 5 and be transported to the outlet tube 8 for retrieval via the spout 9 while the pulp may be ejected over an edge of the sieve 5 to be collected in the pulp receptacle 10. Here, both the grating disc 4 and the filter sieve 5 are arranged to be rotated, although according to alternative embodiments only the grating disc 4 may be arranged to rotate. In the former case, the pulp may be more efficiently ejected into the pulp receptacle 10, but the motor 3 may need to have more power.

Insofar as described above, such food processors 1 and varieties thereof are known in the art. However, the novel features of the grating disc 4 introduced with the present invention are yet to be explained, and will in the following so be with reference to FIG. 2.

Figure 2:
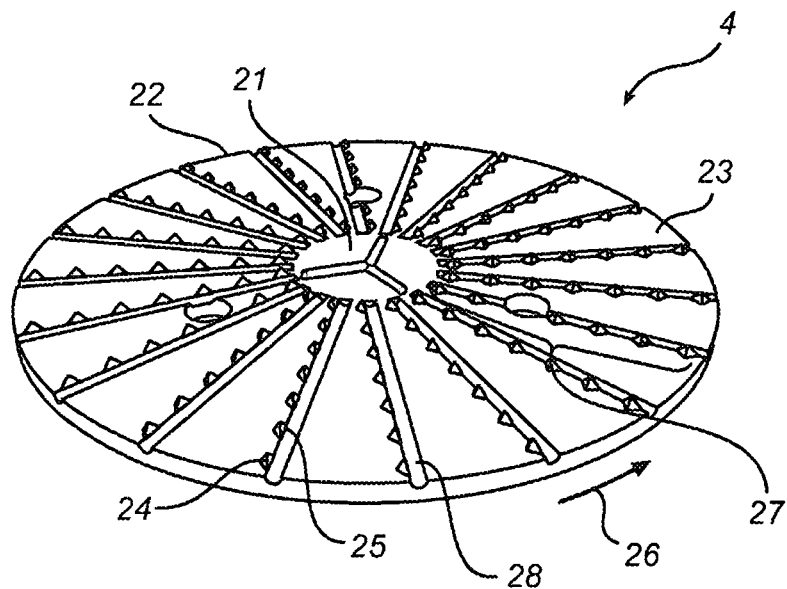
FIG. 2 illustrates the grating disc of the first embodiment in greater detail.

FIG. 2 illustrates the grating disc 4 of the first embodiment in greater detail. The grating disc 4 comprises an inner region 21, here positioned centrally on the grating disc 4, and an outer edge 22, the perimeter of the grating disc 4. The grating disc 4 has an essentially flat disc surface 23 from which a plurality of grating teeth 24 protrudes. The grating teeth 24 are provided for grating of food to be processed and may be of any shape feasible for grating. Each grating tooth 24 has a grating face 25 intended to intersect with the e.g. piece of fruit during use of centrifugal juicer 1. The grating teeth 24 are according to this first embodiment arranged in a plurality of lines 27 radiating from the inner region 21 toward the outer edge 22. Here, the grating teeth 24 and the lines 27 of teeth are uniformly distributed on the disc surface 23, extending essentially all the way out to the outer edge 22. Notably, however, according to alternative embodiments, the lines need not be uniformly distributed. For instance, there may only be a single line 27 provided, the lines 27 may comprise different numbers of grating teeth 24, the grating teeth may be more spaced apart in one line 27 compared to another 27, and one line 27 may be shorter than another 27 etc. Furthermore, here the lines 27 have a straight disposition, although according to alternative embodiments, the lines 27 may for instance be curved or be formed in any other feasible manner across the disc surface 23.

In order to improve the output of processed food, i.e. to extract a higher juice yield, the grating disc 4 furthermore comprises a plurality of grooves 28. Each groove 28 extends from the inner region 21 to the outer edge 22 of the grating disc 4 to assist in guiding food particles, here pulp and juice, outwardly during use of the centrifugal juicer 1. With rotation of the grating disc 4, centrifugal forces resulting from high rotation velocity may act on the fruit particles, whereby the grooves 28 provide an improved manner of transporting the pulp and juice outwardly towards the sieve 5. Each groove 28 is here a hollow extension in the disc surface 23, in which pulp and juice is intended to be transported. In the illustrated example, the groove is around two mm deep, but other depths may also be functional. Each groove 28 may take on any feasible curvature appropriate for guiding the pulp and juice outwardly during rotation of the grating disc 4, and may furthermore be of any appropriate length. Here, all grooves 28 are uniformly distributed, straight and of essentially identical length. Other dispositions are naturally feasible, such as the grooves 28 being unevenly distributed across the disc surface 23, and being of differing length.

According to this first embodiment, each groove 28 is provided along a respective line 27 of grating teeth 24. Here, the groove 28 extends along the entire length of the line 27, although a groove 28 extending only partly along the line 27 is likewise within the scope. Furthermore, in order to improve the cutting functionality of the grating teeth 24, each groove 28 is arranged to extend alongside the grating faces 25 of the grating teeth 24 of the corresponding line 27. Accordingly, the cutting properties of all grating teeth 24 of the line 27 may be improved in that an increased height of the grating face 25 may be provided and the area in front of the grating faces 25 intersecting with the piece of fruit during rotation of the grating disc 4 in the direction of rotation 26, may be kept clean from pulp and juice.

In use of the centrifugal juicer 1, the piece of fruit may be introduced through the inlet piece 6, possibly manually pushed by the pusher 7 towards the grating disc 4, which is rotated by means of the motor 3 in the direction of rotation 26. The grating teeth 24 arranged in lines 27 grate the piece of fruit by means of their respective grating faces 25 as the piece of fruit is pressed against the grating disc 4. The grated material, i.e. the pulp and the juice, is thrown upwardly and outwardly be centrifugal forces against the sieve 5. By means of the grooves 28 arranged along the grating faces 25 of the lines 27, higher efficiency of guiding processed food outwardly as compared to a grating disc lacking such grooves 28 is accomplished, whereby less pulp and juice remain on the grating disc 4. The pulp then carries on over the edge of the sieve 5 and is collected in the pulp receptacle 10 while the finely filtered juice passes through the sieve 5 to be transported to the outlet tube 8 and spout 9. Accordingly, a higher yield of retrieved juice may be attained, and additionally, with less pulp and juice remaining on the grating disc 4, improved cleanability of the grating disc 4 after use of the centrifugal juicer 1 may be achieved.

Figure 3:
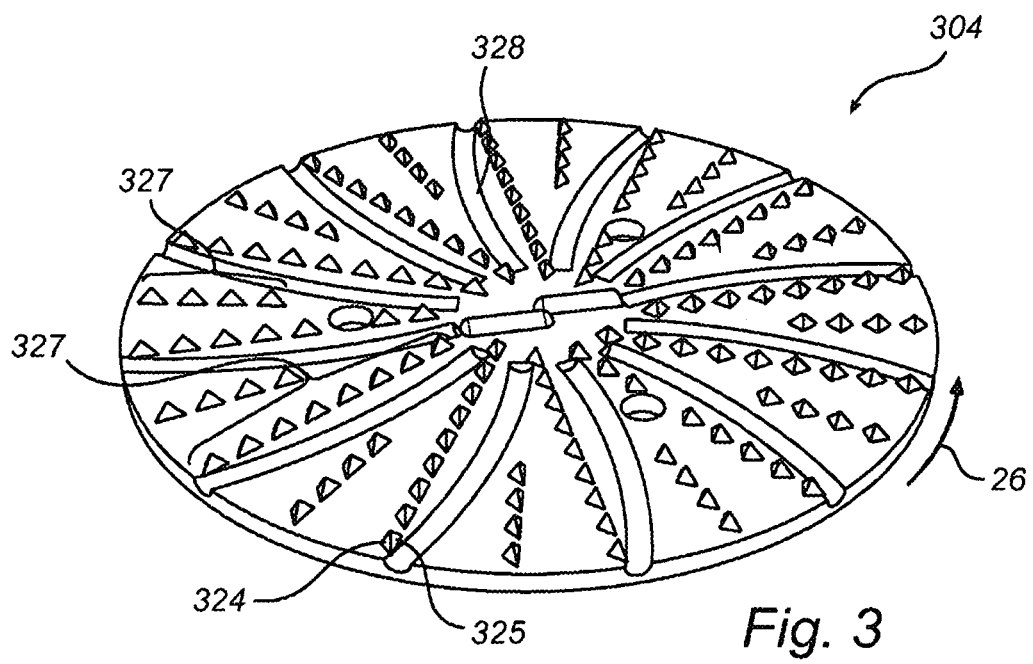
FIG. 3 illustrates an alternative exemplifying grating disc according to a second embodiment of the present invention.

FIG. 3 illustrates an alternative exemplifying grating disc 304 according to a second embodiment of the present invention. Since the grating disc 304 of this second embodiment to great extent resembles the grating disc 4 of the first embodiment, only features distinguishing the second embodiment from the first will be discussed in the following.

According to the second embodiment, rather than a plurality of grating teeth 24 being arranged in lines 27 comprising an identical number of grating teeth 24 as described in the first embodiment, the grating disc 304 is provided with a plurality of grating teeth 324 arranged in lines 327 comprising varying numbers of grating teeth 324. Furthermore, rather than grooves 28 being straight as those shown in FIG. 2, the grating disc 304 of FIG. 3 comprises a plurality of grooves 328 being curved in a convex manner in the direction of rotation 26. With such a design of the grooves 328, maximum acceleration of the pulp and juice is considered, which may hence result in optimized flow outwardly.

With this second embodiment, it is demonstrated that the grooves 328 do not necessarily need to extend along the entire length of each line 327. Moreover, the grooves 328 are here in comparison to the first embodiment provided at a greater distance from the lines 327 of grating teeth 324, and their respective grating faces 325. Additionally, FIG. 3 shows that a groove 328 not necessarily needs be distributed in front of each line 327, but may rather be provided every second line 327.

Thereby, a variety of implementations of the present invention has been provided, which enables for improved output of processed food in that at least one groove 28 with assistance of centrifugal force guides the processed food outwardly for retrieval. However, the person skilled in the art realizes that the present invention by no means is limited to the preferred embodiments described above. On the contrary, many modifications and variations are possible within the scope of the appended claims. For instance, parts of the food processor 1 such as the inlet piece 6, pusher 7, sieve 5, outlet tube 8, spout 9 and pulp receptacle 10, and their dimensions, positioning in relation to each other, as well as their actual presence may differ from one embodiment to another. For instance, the outlet tube 8 and/or spout 9 may be replaced or supplemented by a juice receptacle which may surround the filter sieve 5. Furthermore, the inlet piece 6 may for instance be a feeding tube, and/or the pusher 7 may not be required for pushing the food downwardly onto the grating disc 4.

Variations to the disclosed embodiments can be understood and effected by the skilled addressee in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A grating disc arranged to be rotatably mounted within a food processor and to rotate in a direction of rotation, said grating disc comprising:
a flat grating surface;
a plurality of grating teeth protruding from said flat grating surface arranged in at least one line, each of said at least one line including a plurality of said plurality of said grating teeth; and
at least one hollow extension groove in said flat grating surface, said at least one hollow extension groove extending from an outer edge of said flat grating surface to an inner region of said flat grating surface, one of said at least one hollow extension groove positioned in front of, in the direction of rotation of said flat grating surface, a corresponding one of said at least one line including a plurality of said plurality of said grating teeth.

2. The grating disc according to claim 1, wherein said at least one hollow extension groove is curved to form a bulge in said direction of rotation.

3. The grating disc according to claim 1, wherein said at least one hollow extension groove is essentially straight.

4. The grating disc according to claim 1, wherein each of said plurality of grating teeth having a grating face, said at least one hollow extension groove being arranged alongside said grating face.

5. The grating disc according to claim 1, said at least one line extending from said inner region of said flat grating surface toward said outer edge.

6. The grating disc according to claim 1, wherein each of said at least one line is disposed between two adjacent ones of said hollow extension grooves.

7. A food processor, particularly for extracting juice, comprising a grating disc, said grating disc comprising:
a flat grating surface;
a plurality of grating teeth protruding from said flat grating surface arranged in at least one line extending from an outer edge of said flat grating surface towards an inner region of said flat grating surface; and
at least one hollow extension groove in said flat grating surface, said at least one hollow extension groove extending from said outer edge of said flat grating surface towards said inner region of said flat grating surface, wherein one of said at least one hollow extension groove is positioned in front of a corresponding one of said at least one line of said plurality of said grating teeth in a direction of rotation of said flat grating surface.

8. The food processor according to claim 7, wherein said food processor is a centrifugal juicer.

9. A food processor comprising:
a motor;
a shaft attached to said motor; and
a grating disc engaging said shaft, said grating disc comprising:
a flat surface comprising:
a plurality of teeth protruding from said flat surface, each of said plurality of teeth having a substantially flat surface facing a direction of rotation of said grating disc; and
at least one hollow extension groove in said flat surface, said at least one hollow extension groove extending into said flat surface, each of said at least one hollow extension groove extending from an outer edge of said flat surface towards an inner region of said flat surface, wherein said inner region of said flat surface is closer to said shaft than said outer edge, and wherein said plurality of teeth are arranged in at least one line extending from said outer edge towards said inner region and one of said at least one hollow extension grooves is arranged in front of a corresponding one of said lines of teeth in the direction of rotation.

10. The food processor according to claim 9, wherein selected ones of said lines extend from substantially said inner region to said outer edge.

11. The food processor according to claim 10, wherein said-lines are straight and said corresponding one of said at least one hollow extension groove is straight and positioned in front of said line in the direction of rotation.

12. The food processor according to claim 10, wherein said lines are straight and said corresponding one of said at least one hollow extension groove is convex and positioned in front of said line in the direction of rotation.

13. The food processor according to claim 10, wherein each of said at least one line is positioned between two adjacent ones of said hollow extension grooves.

14. The food processor according to claim 10, wherein said at least one hollow extension groove is straight.

15. The food processor according to claim 10, wherein said at least one hollow extension groove is convex in said direction of rotation of said grating disc.

\* \* \* \* \*